United States Patent
Kimura et al.

[11] Patent Number: 5,928,104
[45] Date of Patent: Jul. 27, 1999

[54] SUPPORTING STRUCTURE FOR ONE-WAY CLUTCH

[75] Inventors: Takao Kimura, Nishikamo-gun; Tadashi Takemura; Seiji Hiroshima, both of Okazaki, all of Japan

[73] Assignee: Mitsubishi Jidosha Kogyo Kabushiki Kaisha, Tokyo, Japan

[21] Appl. No.: 09/008,307

[22] Filed: Jan. 16, 1998

[30] Foreign Application Priority Data

Jan. 20, 1997 [JP] Japan .................................. 9-007257

[51] Int. Cl.⁶ .................................................. F16D 45/00
[52] U.S. Cl. ............................................ 475/318; 192/45.1
[58] Field of Search ................................... 475/318, 346; 192/45.1; 403/359

[56] References Cited

U.S. PATENT DOCUMENTS 5,577,586 11/1996 Buckendahl .......................... 192/45.1
5,632,363 5/1997 Kubo et al. ........................... 192/45.1

FOREIGN PATENT DOCUMENTS 60-23324 U 2/1985 Japan .

*Primary Examiner*—Dirk Wright

[57] ABSTRACT

A structure for supporting a one-way clutch between a planetary gear mechanism and the casing of an automatic transmission. The one-way clutch prevents reverse rotation of a speed-change gear. In the one-way clutch, an outer race and the planetary gear mechanism are integrally fixed to each other. An inner race and the casing are in meshing engagement with each other through a spline formed therebetween. Further, a meshing clearance is formed in the spline such that the inner race can move radially relative to the casing within a range of maintaining the meshed state.

6 Claims, 5 Drawing Sheets

SUPPORTING STRUCTURE FOR ONE-WAY CLUTCH

BACKGROUND OF THE INVENTION

1. Field of the Invention

The present invention relates to a structure for supporting, between a speed-change gear unit and a casing of an automatic transmission for a vehicle, a one-way clutch for preventing reverse rotation of a speed-change gear.

2. Description of the Related Art

An automatic transmission for a vehicle is designed such that through selective supply of pressurized oil to frictional engagement elements such as a clutch and a brake, an arbitrary rotational element within a speed-change gear unit is connected to either an input shaft of the transmission or the casing of the transmission to thereby automatically change the gear ratio in accordance with the traveling state of the vehicle.

Specifically, the crankshaft of an engine is connected to the speed-change gear unit via a torque converter. Torque transmitted from the crankshaft to the torque converter is further transmitted to an input shaft of the speed-change gear unit, which is disposed on the rear side of the torque converter and which constitutes a four-speed transmission having a single reverse gear. The speed-change gear unit is composed of a plurality of sets of clutches and brakes and a single set comprising a one-way clutch and a planetary gear mechanism.

When a driver operates a shift lever disposed in the proximity of a driver's seat of an unillustrated vehicle, the respective frictional engagement elements are brought into an engaged state in accordance with the selected position of the shift lever and the traveling state of the vehicle, and one of the gears is automatically selected by means of hydraulic control unit in response to an instruction from an electronic control unit—which controls the operating state of the engine.

FIG. 5 shows a conventional support structure for a one-way clutch used in an automatic transmission as described above. As shown in FIG. 5, a one-way clutch 101 constituting a speed-change gear unit is disposed between a ring-shaped outer race 104 fixed to a carrier 103 of a planetary gear mechanism 102 and a ring-shaped inner race 106 fixed to a transmission casing 105. The one-way clutch 101 is composed of a plurality of sprags 107 and an end bearing 108 for supporting the sprags 107. Thus, the one-way clutch 101 allows the carrier 103 to rotate in only one direction.

In FIG. 5, numeral 109 denotes an input shaft of the speed-change gear unit; numeral 110 denotes a brake; numerals 111, 112, 113, and 114 respectively denote a ring gear, a short pinion gear, a front sun gear, and a rear sun gear, which constitute the planetary gear mechanism 102; numeral 115 denotes an output shaft of the transmission; and numeral 116 denotes a kick-down drum.

As described above, in the one-way clutch 101, the plurality of sprags 107 are disposed circumferentially between the outer race 104 and the inner race 106. One end of each sprag 107 is in contact with the inner circumferential surface of the outer race 104, while the other end of each sprag 107 is in contact with the outer circumferential surface of the inner race 106. When the rotational direction of the outer race 104 relative to the inner race 106 changes, the inclination angle of each sprag 107 changes in order to allow or prohibit rotation of the outer race 104. In the one-way clutch 101, it is important to maintain a constant distance between the inner circumferential surface of the outer race 104 and the outer circumferential surface of the inner race 106 at all circumferential positions, and therefore the end bearing 108 for supporting the sprags 107 has conventionally been disposed between the outer race 104 and the inner race 106.

In such a conventional structure for supporting the one-way clutch 101, the outer race 104 for supporting the one-way clutch 10 is fixed to the carrier 103 of the planetary gear mechanism 102 connected to the input shaft 109, and the inner race 106 is fixed to the transmission casing 105. The position of the axis of the outer race 104 depends on the assembly accuracy of the planetary gear mechanism 102, while the position of the axis of the inner race 106 depends on the manufacturing accuracy of the transmission casing 105. Therefore, in a case of insufficient assembly accuracy of the planetary gear mechanism 102 or insufficient manufacturing accuracy of the transmission casing 105, there exists an eccentric state in which the axis of the outer race 104 and the axis of the inner race 106 deviate from each other, with the result that the distance between the inner circumferential surface of the outer race 104 and the outer circumferential surface of the inner race 106 varies along the circumferential direction. In such a case, there exists a risk that the sprags 107 do not operate properly in accordance with the rotational direction of the outer race 104.

Although the end bearing 108 is disposed between the inner circumferential surface of the outer race 104 and the outer circumferential surface of the inner race 106 in order to maintain constant the distance therebetween at all circumferential positions, due to a limited installation space therefor the end bearing 108 cannot be increased in size to have an increased rigidity. Therefore, in the above-described case where the outer and inner races 104 and 106 fall in an eccentric state due to insufficient assembly accuracy of the planetary gear mechanism 102 or insufficient manufacturing accuracy of the transmission casing 105, the end bearing 108 wears through sliding contact with both the inner circumferential surface of the outer race 104 and the outer circumferential surface of the inner race 106, resulting in a deterioration in the bearing function. In such a case, there arises a problem that the sprags 107 do not operate properly and become unable to allow or prohibit rotation of the outer race 104 relative to the inner race 106.

A technique that solves the above-described problem is disclosed in, for example, Japanese Utility Model Application Laid-Open (kokai) No. 60-23324. In the "starting clutch for a motorcycle" disclosed in the publication, a one-way clutch composed of a ratchet and rollers is interposed between a crankshaft and a primary drive gear rotatably supported on the crankshaft; a driven gear and a one-way clutch outer race are joined integrally; and female teeth formed on the one-way clutch outer race are engaged with a smaller-diameter portion of teeth at one end of the primary drive gear, wherein at the small diameter portion the tooth height is approximately half that of the remaining portion. Accordingly, the one-way clutch outer race can have some degree of freedom, so as to absorb eccentricity of the one-way clutch outer race caused by a dimensional error in the ratchet portion, thereby enabling proper operation of the one-way clutch.

However, the "starting clutch for a motorcycle" disclosed in Japanese Utility Model Application Laid-Open No. 60-23324 has the following drawbacks. That is, in the above-described one-way clutch, the primary drive gear is supported on the crankshaft; the one-way clutch outer race can move in the radial direction within a distance corresponding to the clearance between the teeth of the smaller diameter portion and the female teeth; and a disc spring is interposed between the primary drive gear and the one-way clutch outer race. Therefore, when the one-way clutch outer race is in an eccentric state, the one-way clutch outer race moves radially relative to the primary drive gear in order to establish alignment therebetween. However, since the driven gear and other components are integrally joined to the one-way clutch outer race, the overall mass of the one-way clutch outer race and other components is large. Therefore, it is difficult for the one-way clutch outer race to move in the radial direction while rotating, resulting in a potential failure to perform alignment reliably.

Further, since the primary drive gear and the one-way clutch outer race are completely separated from each other via a clearance and only the disc spring is interposed therebetween, rotation of the one-way clutch outer race becomes unstable. Moreover, since the alignment of the one-way clutch outer race is performed by the ratchet and the rollers, proper alignment cannot be achieved.

SUMMARY OF THE INVENTION

The present invention was accomplished in order to solve the above-described problems, and an object of the present invention is to provide a structure for supporting a one-way clutch within an automatic transmission, which structure enables easy and reliable alignment even when an assembly error or the like exists between a speed-change gear unit and a transmission casing, thereby smoothing the operation of the one-way clutch and enhancing reliability.

In order to achieve the above object, the present invention provides a one-way clutch supporting structure for supporting a one-way clutch between a speed-change gear unit and the casing of an automatic transmission, wherein the one-way clutch prevents reverse rotation of a speed-change gear. In the support mechanism, an outer race and the speed-change gear unit are integrally fixed to each other; an inner race and the casing are in meshing engagement with each other through a meshing mechanism formed therebetween; and a meshing clearance is formed in the meshing mechanism such that the inner race can move radially relative to the In casing within a range of maintaining the meshed state.

Accordingly, when the outer race, together with the speed-change gear unit, is allowed by the one-way clutch to rotate in one direction, the inner race connected to the casing via the meshing mechanism moves radially relative to the casing within a range corresponding to the meshing clearance such that the axis of the inner race coincides with the axis of the outer race, because the axis of the clutch is defined by the outer race. When the outer race, together with the speed-change gear unit, is about to rotate in the other direction, rotation of the outer race in the other direction is prohibited by the one-way clutch, because the meshing engagement between the inner race and the casing is maintained by the meshing mechanism. Since the inner race— whose mass is relatively small—moves radially within the range corresponding to the meshing clearance while the outer race rotates in the one direction, axial alignment can be performed easily and reliably even when an assembly error exists between the speed-change gear unit and the transmission casing.

Preferably, in the one-way clutch supporting structure of the present invention, an end bearing is disposed between the inner race and the outer race in order to maintain constant the clearance between the races.

In this case, the end bearing disposed between the inner race and the outer race enables more accurate axial alignment. That is, when the outer race is allowed by the one-way clutch to rotate in one direction, the inner race moves radially relative to the casing within a range corresponding to the meshing clearance, because the axis of the clutch is defined by the outer race. Thus, the axial alignment is performed such that the distance between the outer race and the inner race becomes constant at all circumferential positions.

Preferably, in the one-way clutch supporting structure of the present invention, the meshing mechanism is composed of splines respectively formed on the contact surfaces of the inner race and the casing.

In this case, since the meshing mechanism is composed of splines, manufacture thereof is facilitated.

Preferably, in the one-way clutch supporting structure of the present invention, the splines are involute teeth respectively formed on the contact surfaces of the inner race and the casing, and the meshing clearance is formed in the thicknesswise direction of the teeth.

In this case, since the splines are formed of involute teeth and the meshing clearance is formed therebetween in the thicknesswise direction, manufacture of the meshing mechanism is facilitated.

Preferably, in the one-way clutch supporting structure of the present invention, the one-way clutch includes sprags disposed between the inner race and the outer race.

In this case, since the one-way clutch includes sprags between the inner race and the outer race, more accurate and reliable operation is enabled. That is, when the outer race is allowed by the one-way clutch to rotate in one direction, the inner race moves radially relative to the casing within a range corresponding to the meshing clearance. Thus, the axial alignment is performed such that the distance between the outer race and the inner race becomes constant at all circumferential positions. Further, when the outer race is about to rotate in the other direction, the rotation of the outer race is reliably prohibited through action of the sprags.

Preferably, in the one-way clutch supporting structure of the present invention, the speed-change gear unit is a planetary gear mechanism, and pinion gears of the planetary gear mechanism are in meshing engagement with a ring gear of the outer race.

In this case, installation of the one-way clutch to the automatic transmission is facilitated.

DESCRIPTION OF PREFERRED EMBODIMENT

An embodiment of the present invention will be described in detail with reference to the drawings.

Figure 1:
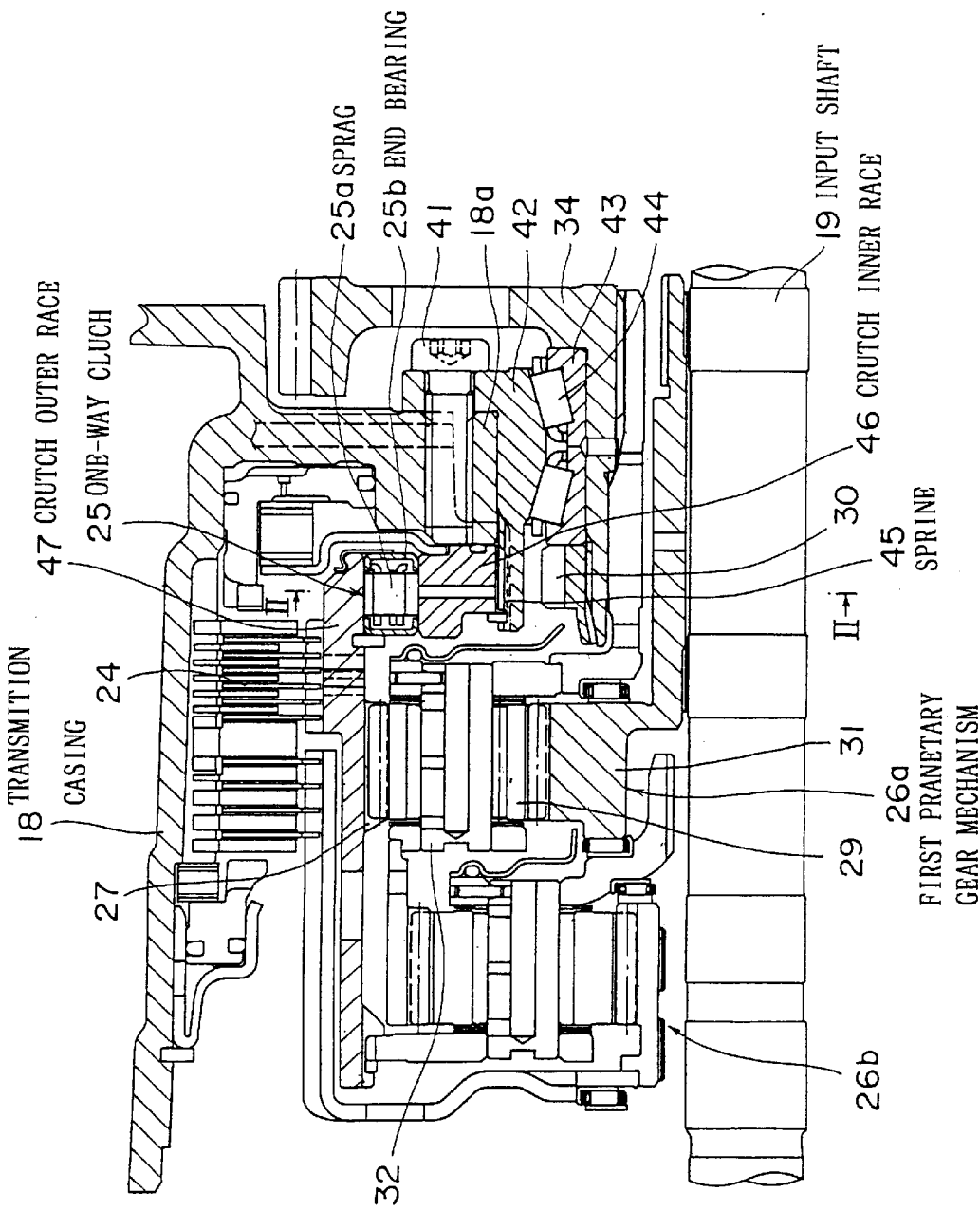
FIG. 1 is a cross-sectional view of a main portion of an automatic transmission showing a one-way clutch supporting structure according to an embodiment of the present invention.
Figure 2:
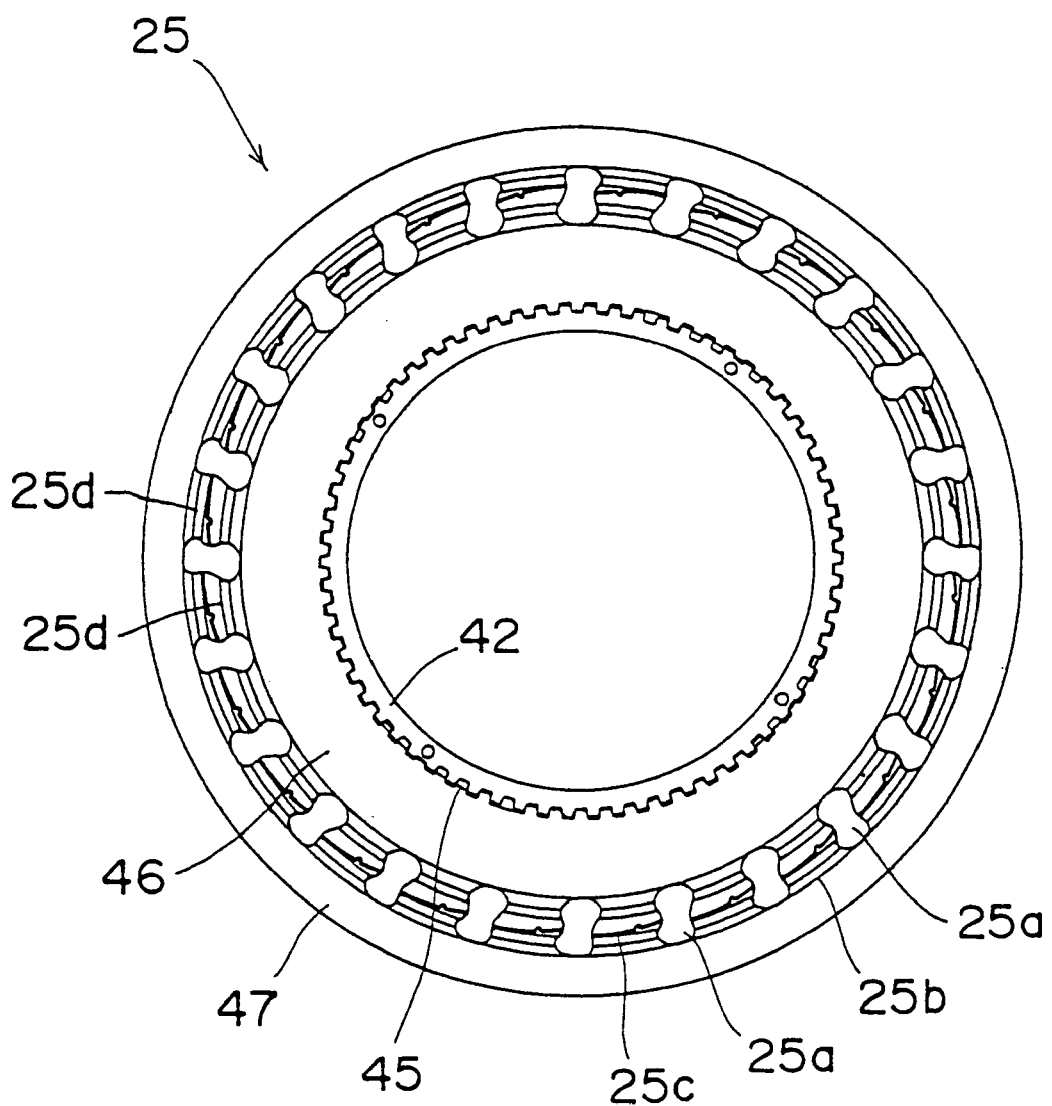
FIG. 2 is a cross-sectional view taken along line II—II in FIG. 1.
Figure 3:
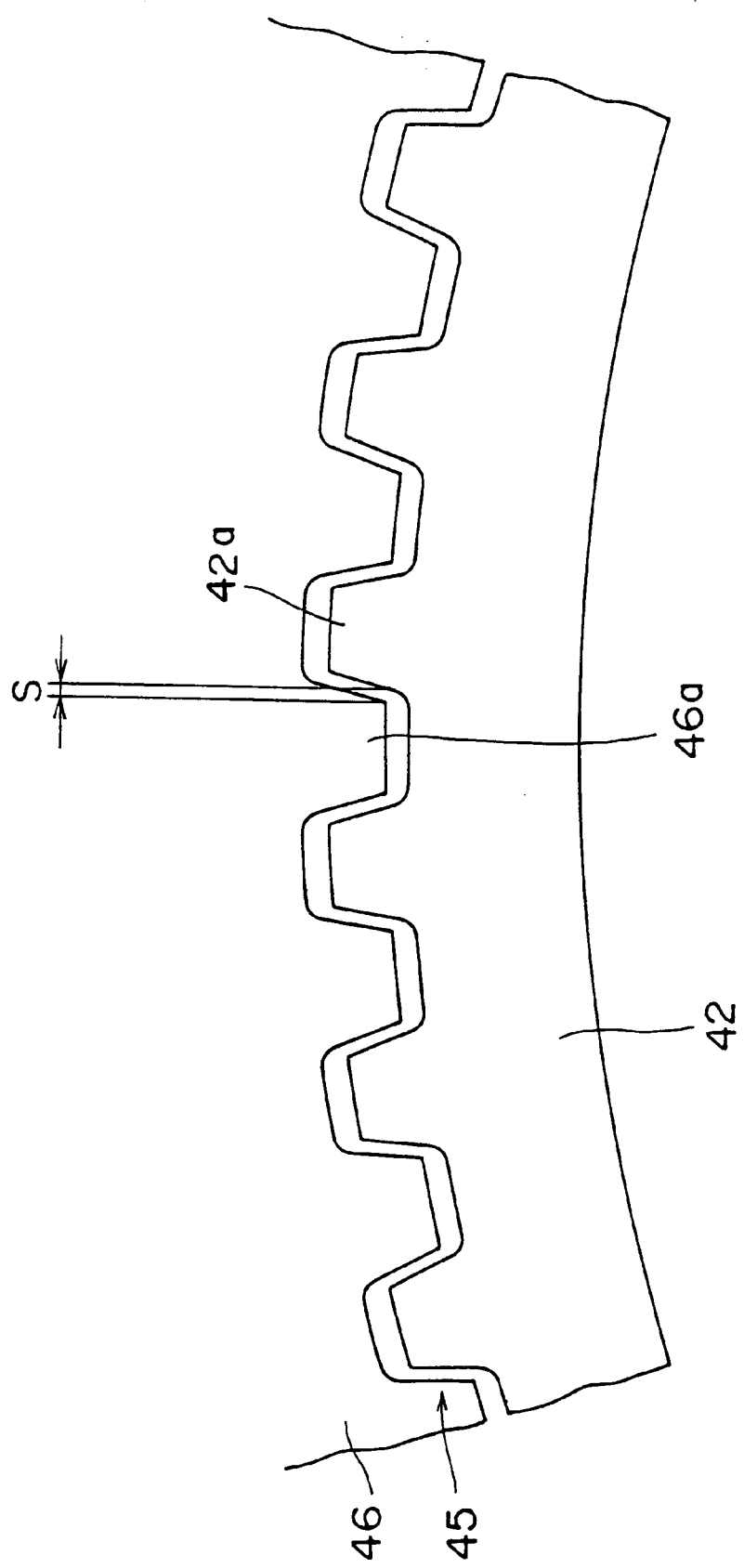
FIG. 3 is an enlarged view showing a meshing clearance in the one-way clutch supporting structure according to the embodiment.

FIG. 1 is a cross-sectional view of a main portion of an automatic transmission showing a one-way clutch supporting structure according to an embodiment of the present invention; FIG. 2 is a cross-sectional view taken along line II—II in FIG. 1; FIG. 3 is an enlarged view showing a meshing clearance in the one-way clutch supporting structure according to the embodiment; and FIG. 4 is a diagram schematically showing the structure of an automatic transmission to which the one-way clutch supporting structure according to the embodiment is applied.

Figure 4:
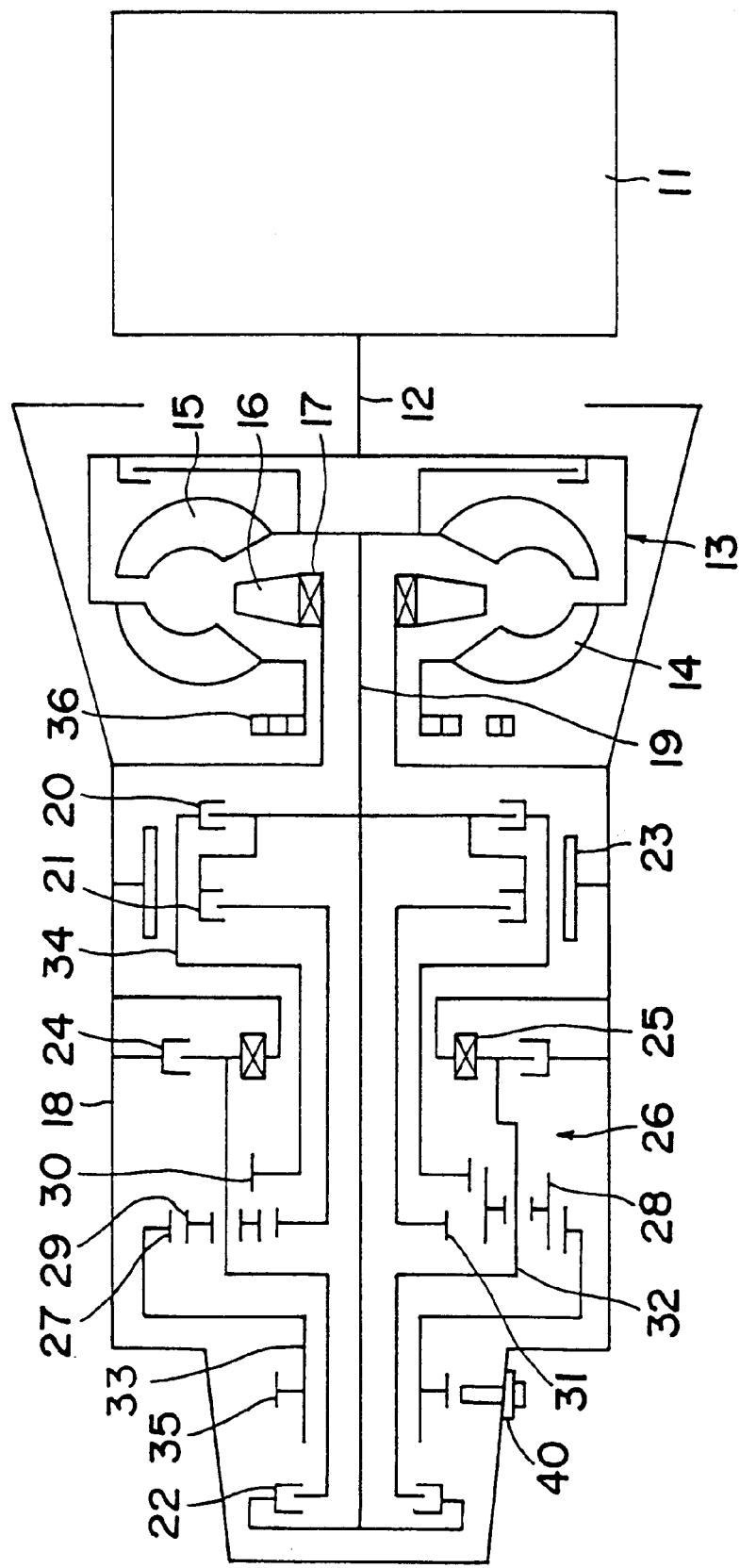
FIG. 4 is a diagram schematically showing the structure of an automatic transmission to which the one-way clutch supporting structure according to the embodiment is applied.
Figure 5:
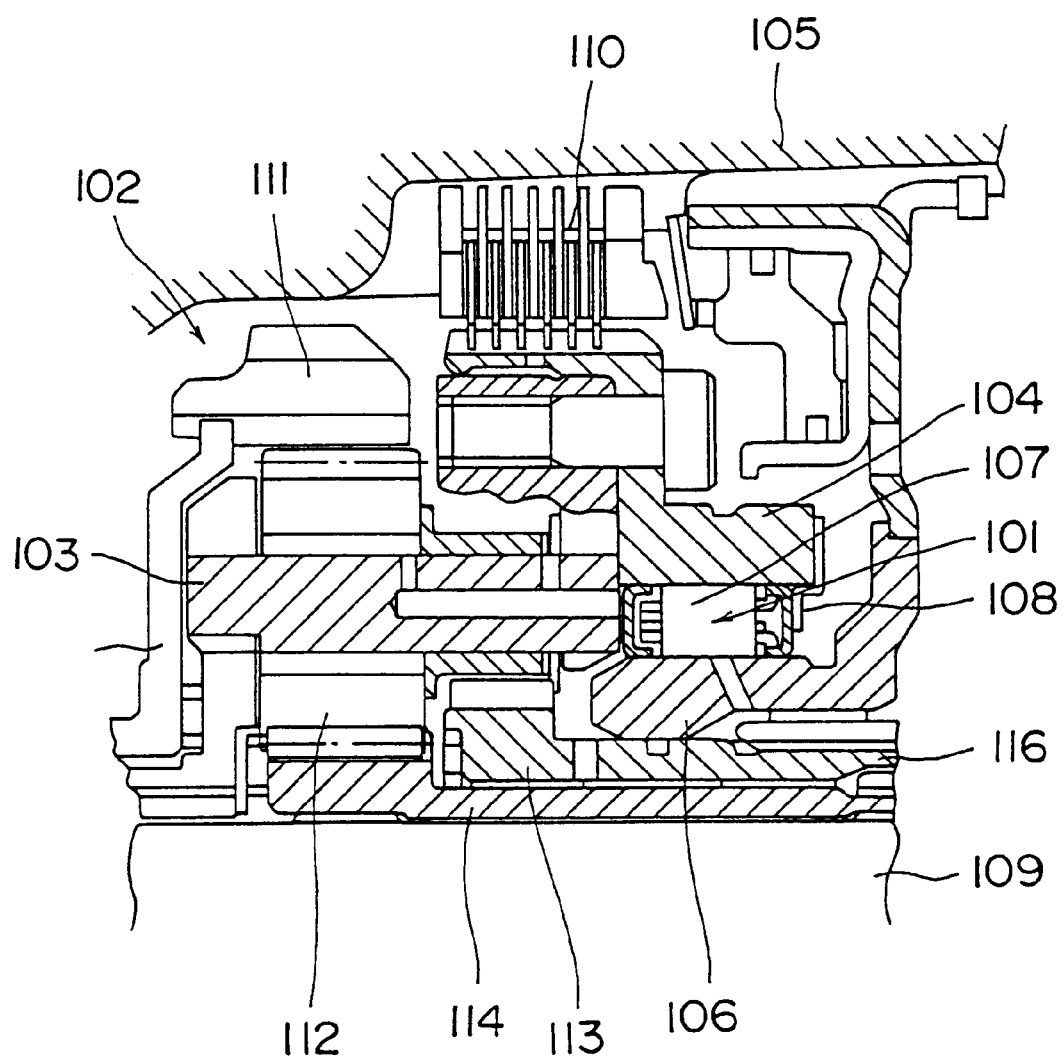
FIG. 5 is a cross-sectional view of a main portion of an automatic transmission showing a conventional one-way clutch supporting structure.

As shown in FIG. 4, in the automatic transmission according to the present embodiment, an impeller 14 of a torque converter 13 is integrally connected to a crankshaft 12 of an engine 11. The torque converter 13 includes the impeller 14, a turbine 15, a stator 16, and a one-way clutch 17. The stator 16 is connected to a transmission casing 18 via the one-way clutch 17, such that the one-way clutch 17 allows the stator 16 to rotate in the same direction as that of the crankshaft 12 but prohibits rotation in the opposite direction. Torque transmitted to the turbine 15 is transmitted to an input shaft 19 of a speed-change gear unit, which is disposed on the rear side of the torque converter 13 and which constitutes a four-speed transmission having a single reverse gear.

The speed-change gear unit is composed of three sets of clutches 20, 21, and 22, two sets of brakes 23 and 24, a one-way clutch 25, and a planetary gear mechanism 26. The planetary gear mechanism 26 is composed of a ring gear 27, a long pinion gear 28, a short pinion gear 29, a front sun gear 30, a rear sun gear 31, and a carrier 32. The carrier 32 rotatably supports the pinion gears 28 and 29 and is rotatably fitted on the transmission input shaft 19.

The ring gear 27 is connected to a transmission output shaft 33, and the front sun gear 30 is connected to the transmission input shaft 19 via a kick-down drum 34 and the front clutch 20. Further, the rear sun gear 31 is connected to the transmission input shaft 19 via the rear clutch 21. The carrier 32 is connected to the transmission casing 18 via the low/reverse brake 24 and the one-way clutch 25, which are disposed in parallel. The carrier 32 is also connected to the transmission input shaft 19 via the end clutch 22 disposed at the rear end of the speed-change gear unit. The kick-down drum 34 is designed to be integrally joined with the transmission casing 18 through operation of the kick-down brake 23. Torque output from the planetary gear mechanism 26 is transmitted via a drive gear 35 fixed to the transmission output shaft 33 to an unillustrated drive axle coupled with drive wheels.

The clutches 20, 21, and 22 and the brakes 23 and 24, each of which serves as a frictional engagement element, are each composed of a hydraulic unit having a piston apparatus or a servo apparatus for engagement purpose, and are operated via a hydraulic control unit by means of pressurized oil discharged from an oil pump 36 connected to the impeller 14 of the torque converter 13.

Accordingly, when a driver operates a shift lever disposed in the proximity of a driver's seat of an unillustrated vehicle, the respective frictional engagement elements are brought into an engaged state in accordance with the selected position of the shift lever and the traveling state of the vehicle, and one of the gears is automatically selected by means of the hydraulic control unit in response to an instruction from an electronic control unit—which controls the operating state of the engine 11.

As shown in FIG. 1, in the one-way clutch supporting mechanism of the present embodiment applied to the above-described automatic transmission, a bearing outer race 42 is fixed by bolts 41 to a flange portion 18a integrally formed on the inner wall of the transmission casing 18, and the bearing outer race 42 constitutes a bearing in cooperation with a bearing inner race 43 and rollers 44. The kick-down drum 34 is fixed to the inner circumferential surface of the bearing (bearing inner race 43) and is rotatably supported by the transmission housing 18 via the bearing. The clutch inner race 46 is connected to the outer circumferential surface of one end of the bearing outer race 42 via a spline 45 serving as a meshing mechanism.

Within the transmission casing 18 are disposed two planetary gear mechanisms 26a and 26b, which constitute the speed-change gear unit 26. The pinion gear 29 of the first planetary gear mechanisms 26a is in meshing engagement with the ring gear 27 formed on a clutch outer race 47. The one-way clutch 25 is disposed between the above-described clutch inner race 46 and the clutch outer race 47. The one-way clutch 25 is provided in order to prevent reverse rotation of the speed-change gear within the automatic transmission and is connected to the first planetary gear mechanism 26a via the clutch outer race 47 in order to allow rotation of the first planetary gear mechanism 26a in one direction only. That is, as specifically shown in FIG. 2, the one-way clutch 25 includes a plurality of sprags 25a and an end bearing 25b for supporting the sprags 25a. Each of the sprags 25a is urged to stand by a ribbon spring 25c, while one end of each sprag 25a is in contact with the outer circumferential surface of the clutch inner race 46 and the other end of each sprag 25a is in contact with the inner circumferential surface of the clutch outer race 47. The sprags 25a are held by two support rings 25d for synchronized movement, so that load acting on the sprags 25a is equally borne thereby.

In the one-way clutch supporting structure according to the present embodiment, the clutch inner race 46 and the transmission casing 18 (bearing outer race 42) are in meshing engagement with each other through the spline 45, and a meshing clearance is formed in the spline 45 such that the clutch inner race 46 can move radially relative to the transmission casing 18 within a range of maintaining the meshing engagement. Specifically, as shown in FIG. 3, a clearance S is formed between each involute tooth 46a of the clutch inner race 46 and a corresponding involute tooth 42a of the bearing outer race 42 in the thicknesswise direction of the teeth. In the case of involute teeth, the clearance S is conventionally set to fall within the range of approximately 0.027–0.074 mm. However, in the present embodiment, the clearance S is set to fall within the range of approximately 0.182–0.267 mm. The thus-set clearance S allows the clutch inner race 46 to move radially relative to the transmission casing 18.

The spline 45 composed of the involute teeth 46a of the clutch inner race 46 and the involute teeth 42a of the bearing outer race 42 has a module $\frac{1}{50}$ to $\frac{1}{100}$ times the reference pitch diameter and has a pressure angle of 0–10°. That is, the number of teeth is increased through a reduction in size in order to yield a small pressure angle. When rotation of the clutch outer race 47 is prohibited by the one-way clutch 25 (sprags 25a), radial impact force acts on the end bearing 25b. However, this impact force acting on the end bearing 25b can be mitigated greatly by means of the tooth shape of the spline 45.

In FIG. 1, numeral 19 denotes the transmission input shaft, numeral 24 denotes the low/reverse brake, numeral 30 denotes the font sun gear, numeral 31 denotes the rear sun gear, and numeral 32 denotes the carrier.

As described above, the one-way clutch 25 is supported between the transmission casing 18 and the first planetary gear mechanism 26a; the clutch inner race 46 is connected to the transmission casing 18 (bearing outer race 42) via the spline 45; and the meshing clearance S is formed in the spline 45 in order allow radial movement of the clutch inner race 46. Therefore, when the clutch outer race 47 is allowed by the one-way clutch 25 to rotate in one direction, the clutch inner race 46 moves radially relative to the transmission casing 18 within the range corresponding to the meshing clearance S such that the axis of the clutch inner race 46 coincides with the axis of the clutch outer race 47, Be because the axis of the clutch is defined by the clutch outer race 47. At this time, since the end bearing 25b is disposed between the clutch inner race 46 and the clutch outer race 47, the distance between the clutch inner race 46 and the clutch outer race 47 becomes constant at all circumferential positions, and unnecessary force does not act on the end bearing 25b. Further, since the clutch inner race 46 whose weight is small radially moves within the range corresponding to the meshing clearance S while axial alignment is established between the clutch inner race 46 and the clutch outer race 47, the axial alignment can be performed easily and reliably.

In contrast, when the clutch outer race 47 is about to rotate in the other direction, the rotation of the clutch outer race 47 in the other direction is prohibited by the one-way clutch 25, because the meshing engagement between the clutch inner race 46 and the transmission casing 18 is maintained by the spline 45. Thus, reverse rotation of the first planetary gear mechanism 26a and the like is prevented.

As specifically described in the embodiment, in the one-way clutch supporting structure of the present invention, the outer race and the speed-change gear unit are integrally fixed to each other; the inner race and the casing are in meshing engagement with each other through a meshing mechanism formed therebetween; and a meshing clearance is formed in the meshing mechanism such that the inner race can move radially relative to the casing within a range of maintaining the meshed state. Accordingly, when the outer race is allowed by the one-way clutch to rotate in one direction, the axis of the clutch is defined by the outer race and the inner race whose weight is small moves radially relative to the casing within a range corresponding to the meshing clearance such that the axis of the inner race coincides with the axis of the outer race. Therefore, axial alignment can be performed easily and reliably even when an assembly error exists between the speed-change gear unit and the transmission casing. Thus, the operation of the one-way clutch is made smooth and the reliability is enhanced.

In the one-way clutch supporting structure of the present invention, an end bearing is disposed between the inner race and the outer race in order to maintain constant the clearance between the races. Therefore, when the outer race is allowed by the one-way clutch to rotate in one direction, the inner race moves radially relative to the casing within a range corresponding to the meshing clearance, so that the axial alignment is performed such that the distance between the outer race and the inner race becomes constant at all circumferential positions.

Further, in the one-way clutch supporting structure of the present invention, since the meshing mechanism is composed of splines that are formed on the contact surfaces of the inner race and the casing, manufacture thereof is facilitated and costs can be reduced.

Further, in the one-way clutch supporting structure of the present invention, since the splines are involute teeth respectively formed on the contact surfaces of the inner race and the casing, and the meshing clearance is formed in the thicknesswise direction of the teeth, manufacture of the meshing mechanism is facilitated and costs can be reduced.

Further, in the one-way clutch supporting structure of the present invention, the one-way clutch includes sprags between the inner race and the outer race. Therefore, when the outer race is allowed by the one-way clutch to rotate in one direction, the inner race moves radially relative to the casing within a range corresponding to the meshing clearance. Thus, the axial alignment is performed such that the distance between the outer race and the inner race becomes constant at all circumferential positions. Further, when the outer race is about to rotate in the other direction, the rotation of the outer race is reliably prohibited through action of the sprags, so that reverse rotation of the speed-change gear unit is prevented.

Moreover, in the one-way clutch supporting structure of the present invention, the speed-change gear unit is a planetary gear mechanism, and pinion gears of the planetary gear unit are in meshing engagement with a ring gear of the outer race. Therefore, installation of the one-way clutch to the automatic transmission is facilitated.

What is claimed is:

1. A one-way clutch supporting structure for supporting a one-way clutch between a speed-change gear unit and the casing of an automatic transmission, said one-way clutch preventing reverse rotation of a speed-change gear, wherein an outer race and said speed-change gear unit are integrally fixed to each other; an inner race and said casing are in meshing engagement with each other through a meshing mechanism formed therebetween; and a meshing clearance is formed in said meshing mechanism such that said inner race can move radially relative to said casing within a range of maintaining the meshed state.

2. A one-way clutch supporting structure according to claim 1, wherein an end bearing is disposed between said inner race and said outer race in order to maintain constant the clearance between said races.

3. A one-way clutch supporting structure according to claim 1, wherein said meshing mechanism is composed of splines respectively formed on contact surfaces of said inner race and said casing.

4. A one-way clutch supporting structure according to claim 3, wherein said splines are involute teeth respectively formed on the contact surfaces of said inner race and said casing, and said meshing clearance is formed in the thicknesswise direction of the teeth.

5. A one-way clutch supporting structure according to claim 1, wherein said one-way clutch includes sprags disposed between said inner race and said outer race.

6. A one-way clutch supporting structure according to claim 1, wherein said speed-change gear unit is a planetary gear mechanism, and pinion gears of said planetary gear unit are in meshing engagement with a ring gear of said outer race.

* * * * *